Oct. 20, 1953  L. C. CRONBERGER  2,655,759
ANIMAL TRAP
Filed June 26, 1950  3 Sheets-Sheet 1

INVENTOR.
Lothar L. Cronberger
BY

Oct. 20, 1953  L. C. CRONBERGER  2,655,759
ANIMAL TRAP

Filed June 26, 1950  3 Sheets-Sheet 2

INVENTOR.
Lothar C. Cronberger
BY

Oct. 20, 1953 L. C. CRONBERGER 2,655,759
ANIMAL TRAP
Filed June 26, 1950 3 Sheets-Sheet 3

INVENTOR
LOTHAR C. CRONBERGER
BY
ATTORNEY

Patented Oct. 20, 1953

2,655,759

UNITED STATES PATENT OFFICE 2,655,759

ANIMAL TRAP

Lothar C. Cronberger, Tulsa, Okla.

Application June 26, 1950, Serial No. 170,414

16 Claims. (Cl. 43—60)

This invention relates to animal traps in general, and more particularly mouse traps.

One object of the invention is to provide an improved animal trap of the kind wherein the animal to be trapped is induced to enter a receptacle adapted to be tilted from a substantially horizontal position to a substantially vertical position under the action of the weight of the animal moving therein.

Another object of the invention is to provide a trap which is relatively insensitive against shock and vibrations and therefore does not tend to operate unintentionally without an animal having entered into it, which trap, however, is extremely sensitive and rapidly operating due to a trigger action initiated by the weight of an animal that has entered into the trap.

Other objects of the invention are to provide a trap which enables one to conveniently dispose of the trapped animal, which can readily be cleaned and sterilized and which precludes any injury to the person setting the trap, or to domestic animals.

There are two broad principles for the design of animal traps of the kind comprising a tubular receptacle to be tilted from a substantially horizontal to a substantially vertical position under the weight of an animal moving therein. The first design principle consists in using the weight of the animal for effecting a simple tilting motion of the animal-trapping receptacle. Adoption of this design principle results in inexpensive, rugged traps which, however, are too insensitive, i. e. their tilting motion is too slow and not sufficiently positive. The second design principle consists in using the weight of the animal to unlatch a source of tilting power, such as a spring or weight, which source of tilting power quickly tilts the animal-trapping receptacle from a substantially horizontal to a steeply inclined or substantially vertical position, whereby the animal is trapped. Adoption of this design principle yields efficient traps but is conducive to relatively expensive and complicated structures.

It is, therefore, a further object of the invention to provide an animal trap which is predicated on an entirely new principle not subject to the limitations inherent in the two aforementioned design principles.

Further objects and advantages of the invention will be more fully apparent from the particular description thereof, in conjunction with the appended drawings which show, in preferred forms, several novel mechanisms of the invention.

As mentioned before, this invention refers to animal traps comprising a tubular receptacle adapted to be tilted from a substantially horizontal position to a substantially vertical position under the action of the weight of an animal moving therein. According to the present invention the trap is provided with guiding means for the animal-trapping receptacle for causing a composite motion thereof from said substantially horizontal position to said substantially vertical position. This composite motion consists of a tilting component and another component for lowering the animal-trapping receptacle more rapidly than by said tilting component alone.

The drawings illustrate as preferred embodiments of the above composite motion guiding means a pivotally mounted holder slidingly supporting the animal-trapping receptacle. The trapping-efficiency of this particular embodiment of the invention is predicated upon the co-action of two factors: The animal-trapping receptacle begins to tilt at the instant its balance is upset by the animal moving therein. The tilting motion of the receptacle in turn causes the receptacle to slide relative to the holder in a direction longitudinally of the former and, because of that sliding motion, the receptacle is lowered much more rapidly than by its tilting motion alone. The rate at which the receptacle is swung from a susbtantially horizontal to a substantially vertical position is so rapid that the animal has not the slightest chance to re-establish the equilibrium and to escape out of the trapping receptacle.

Figure 1:
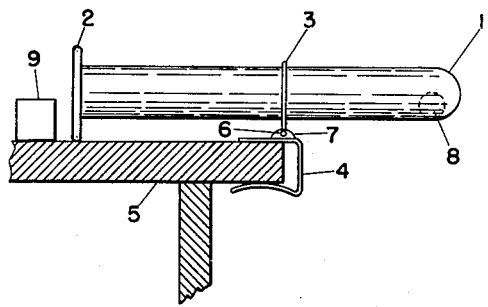
Figs. 1 to 4 are side views, partly in vertical section, of four consecutive positions of a mouse trap embodying the invention.

Fig. 1 shows a mouse trap comprising a tubular receptacle 1 substantially in the shape of a test tube. The receptacle 1 consists of a polymerized plastic material having an extremely smooth external surface. The open end of the receptacle 1 is provided with a rim 2 having a slightly larger diameter than the outer diameter of the receptacle. Receptacle 1 is supported by a substantially annular metal holder 3 having a smooth internal surface to minimize friction between said internal surface and the external surface of receptacle 1. A clamp 4 is arranged with the open end thereof in the same direction as the the open end of receptacle 1. Clamp 4 is of the resilient type and is shown as being resiliently secured to a table-top 5 from which one end of receptacle 1 projects in cantilever fashion. Holder 3 is pivotally supported at 6 by clamp 4 to permit pivotal movement thereof relative to clamp 4 about an axis of rotation arranged transversely with respect to receptacle 1.

Figure 5:
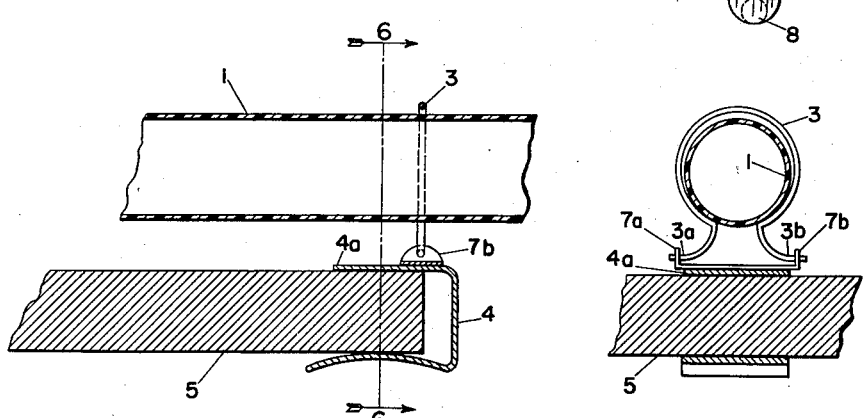
Fig. 5 shows a longitudinal section through the center portion of the trap according to Figs. 1 to 4.
Figure 6:
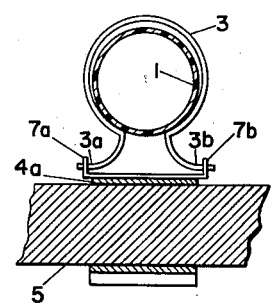
Fig. 6 is a transversal section along 6—6 of Fig. 5.

As best shown in Figs. 5 and 6, the upper shank 4a of clamp 4 supports a substantially U-shaped bracket 7 which provides bearings 7a, 7b for the horizontally bent ends or trunnions 3a, 3b of a holder 3, which is shaped similar to the Greek letter Ω.

In the position of the trap shown in Fig. 1 the trap tube or receptacle 1 tends to tilt in a counterclockwise direction about the pivot of holder 3 and rests with its rim 2 upon the table-top 5. A bait 8 is placed adjacent the closed end of the receptacle 1. A mouse 9 is allured by bait 8 but has not entered the trapping receptacle as yet.

Figure 2:
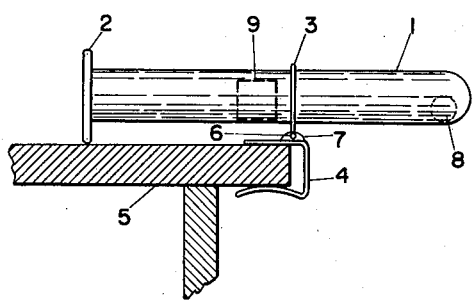

Fig. 2 shows the mouse 9 moving within receptacle 1. The mouse has not yet reached the critical pivot point 6.

Figure 3:
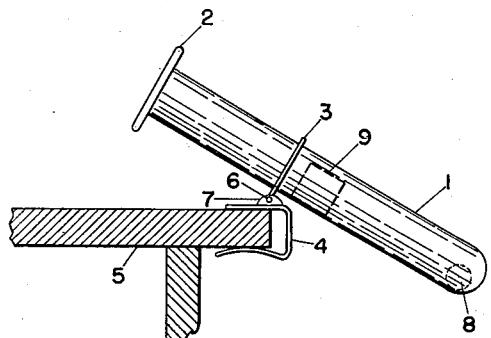

Fig. 3 shows the position of the parts of the trap and that of the mouse 9 after the latter has moved beyond the critical point 6 where receptacle 1 is pivotally supported. Receptacle 1 and holder 3 have been tilted simultaneously and receptacle 1 has been further lowered owing to its sliding motion in a direction longitudinally thereof relative to the holder 3. This dual motion produces a sudden jerk which precludes the mouse from jumping back to the pivot point 6 which would enable its escape. This sudden jerk caused by a relatively high acceleration of receptacle 1 does not only prevent the mouse from moving backward but tends to initiate a downward motion of the mouse relative to the receptacle 1. The rate at which such a sliding motion will occur in point of time, all other conditions remaining unchanged, will be determined by the smoothness of the internal surface of the receptacle 1. Receptacles of glass or of a suitable polymerized plastic material are most effective in preventing the animal about to be trapped from gaining a foothold along the internal surface of the trapping receptacle before dropping to its bottom.

Figure 4:
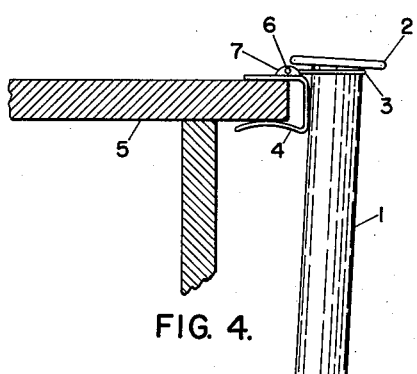

Fig. 4 shows the trapping receptacle 1 in a virtually vertical position so held by engagement of rim 2 and holder 3. These parts form cooperating abutments for supporting the receptacle 1 in substantially vertical position, whereby the trapped animal is precluded from getting out of it.

Figure 7:
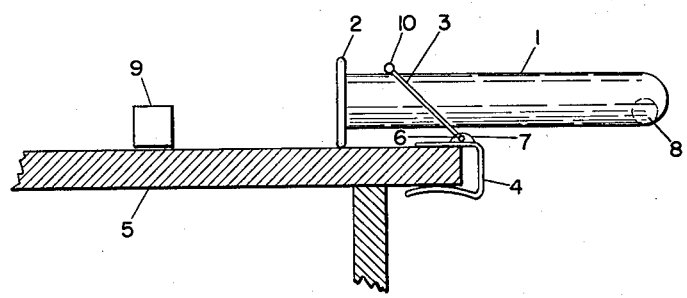
Fig. 7 is a side view, partly in vertical section, of a modification of the structure shown in Figs. 1 to 6.

In Fig. 7 the same reference signs as in Figs. 1 to 6 have been applied to indicate like parts. According to Fig. 7 the annular holder 3 is provided with a counter-weight 10 which forms an integral part of the holder. Because of the effect of counter-weight 10 a relatively shorter length of trapping tube needs to rest to the left of the point about which receptacle 1 is adapted to be tilted. It will be apparent from Fig. 7 that in the embodiment of the invention shown in this figure the receptacle 1 does not pivot about the pivot 6 of the holder 3. In this embodiment of the invention receptacle 1 and holder 3 are adapted to be tilted about different horizontal axes when the initial equilibrium of receptacle 1 is upset by the animal intended to be trapped therein. Holder 3 then turns about pivot 6 and receptacle 1 is then tilted about the edge defined by the upper shank 4a of clamp 4 and the vertical surface of said clamp.

In any trap according to the present invention which does not comprise a counter-weight the receptacle 1 ought to be arranged in such a way that the axis about which it can be tilted is situated fairly close to the center of gravity of the receptacle; this axis must, however, not be too close to the center of gravity of the receptacle in order to safely prevent upsetting of the initial equilibrium conditions by unintentional jolts or vibrations to which the trap may be subjected. Where a counter-weight 10 forming an integral part of holder 3 is used to counterbalance the weight of the receptacle, the axis about which the receptacle is adapted to be tilted ought to be situated between the center of gravity of the receptacle and the center of gravity of the holder.

Figure 8:
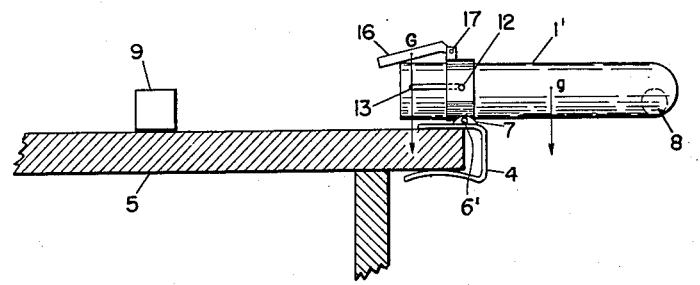
Fig. 8 is a side view, partly in vertical section, of another modification of the structure shown in Figs. 1 to 6.
Figure 9:
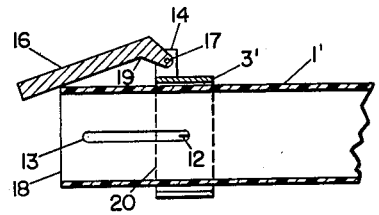
Fig. 9 shows a portion of Fig. 8 on a larger scale.
Figure 10:
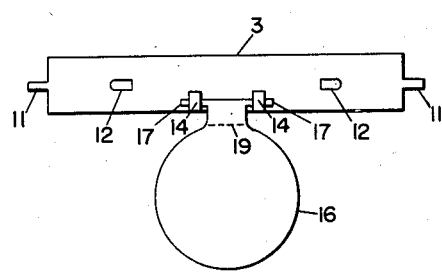
Fig. 10 shows a detail of the holder and lid structure shown in Figs. 8 and 9.

In the embodiment of the invention shown in Figs. 8 to 10 the length of the trapping tube or receptacle has been drastically reduced by provision of a heavier counter-weight in the form of a lid 16 which closes the trapping receptacle in the vertical position thereof. The trapping receptacle 1' is loosely surrounded by an annular holder 3' made of a piece of sheet metal.

Fig. 10 shows a piece of sheet metal intended to form a receptacle holder 3' after being punched as required for that purpose but before being bent to the required substantially annular shape. The two ends of the piece of sheet metal are provided with extensions 11 to form pivots or trunnions upon being inserted into suitable bearing holes in bracket 7. The two lips 12 formed by the strip of sheet metal shown in Fig. 10 are intended to be bent 90 degrees out of the plane of the strip to form abutment means upon insertion thereof into two longitudinal slots 13 with which the portion of the receptacle 1' adjacent to the open end thereof is provided. Lips 12 limit in conjunction with slots 13 the amount of sliding motion of receptacle 1' relative to holder 3'. The strip of sheet metal shown in Fig. 10 is further provided with a pair of upturned lips 14 adapted to form bearings for hingedly supporting the lid 16 of the receptacle 1'. Lid 16 has a pair of opposite projecting extensions 17 inserted into suitable holes in lips 14 to serve as trunnions or pivots for the lid. In the position of receptacle 1' and lid 16 shown in Figs. 8 and 9, the lid engages, and rests upon, the external lateral surface of the receptacle 1' adjacent the open end thereof. The center of gravity g of receptacle 1' is situated far to the right of the common axis 6' about which receptacle 1' and holder 3' are adapted to be tilted. The center of gravity G of the counter-weight formed by lid 16 is situated at the left of axis 6'. Evidently the lever arm of the relatively substantial counter-weight 16 is much shorter than the lever arm of the relatively light receptacle 1'. At the instant the center of gravity of the animal to be trapped comes to lie to the right of a vertical plane through axis 6', holder 3' and receptacle 1' are tilted in a clockwise direction about axis 6' and simultaneously receptacle 1' slides in a direction longitudinally thereof relative to holder 3' until restrained from further sliding motion by engagement of the left upper ends of slots 13 by bent lips 12. At the instant holder 3' is stopped by engagement of the abutment means 12, 13 the left upper edge 20 of holder 3' is situated slightly beyond the edge 18 defining the entrance of receptacle 1'. As receptacle 1' is sliding from left to right in a downward direction, lid 16 loses the support heretofore given to it by the lateral wall of receptacle 1'. Therefore lid 16 is free to pivot in a counterclockwise direction about its pivotal support 17, 14. Lid 16 is provided with a slight bend at 19 which enables it to rest against the edge 20 of holder 3' when receptacle 1' has reached its vertical position. Lid 16 then closes firmly the top of the receptacle 1', safely precluding the escape of the animal which is trapped therein. The animal so caught is unharmed and kept out of sight of anyone if receptacle 1' is made of an opaque material. The animal can be disposed of without direct contact either with it, or with any part of the trap that has been in contact with it.

The receptacle may be made of plastic-impregnated paper such as, for instance, used for milk containers. A receptacle of that kind may be adapted to be readily disposed of. This modification of the invention permits one to dispose together of the mouse and the receptacle in the most sanitary way, like garbage.

Using receptacles of paper permits one also to print instructions directly on the outside of the receptacle, thus dispensing with the necessity of adding a separate instruction sheet to the trap.

The plastic-impregnated paper receptacle 1' should preferably be sufficiently tapered toward the closed end thereof to permit stacking of a plurality of identical receptacles to limit storage and shipping space. The taper may be such as to limit the sliding motion of the receptacle relative to the holder 3, thus making it possible to dispense with additional abutment means for that purpose. If the receptacle 1' is made of a material not intended for repeated use and adapted to be readily disposed of, then it is desirable to affix an unperishable poisonous bait inside of the receptacle adjacent the closed end thereof. The bait may, for instance, consist of poisoned grain 8' which is glued to the bottom of the trapping receptacle, thus forming structurally a self-sustained ready-to-use bait-receptacle-unit which does not need to be supplied with bait by the user of the trap, from which the bait cannot be lost, and wherein the poisonous bait is inaccessible to any person or animal other than the one that is intended to be trapped and killed.

Figure 11:
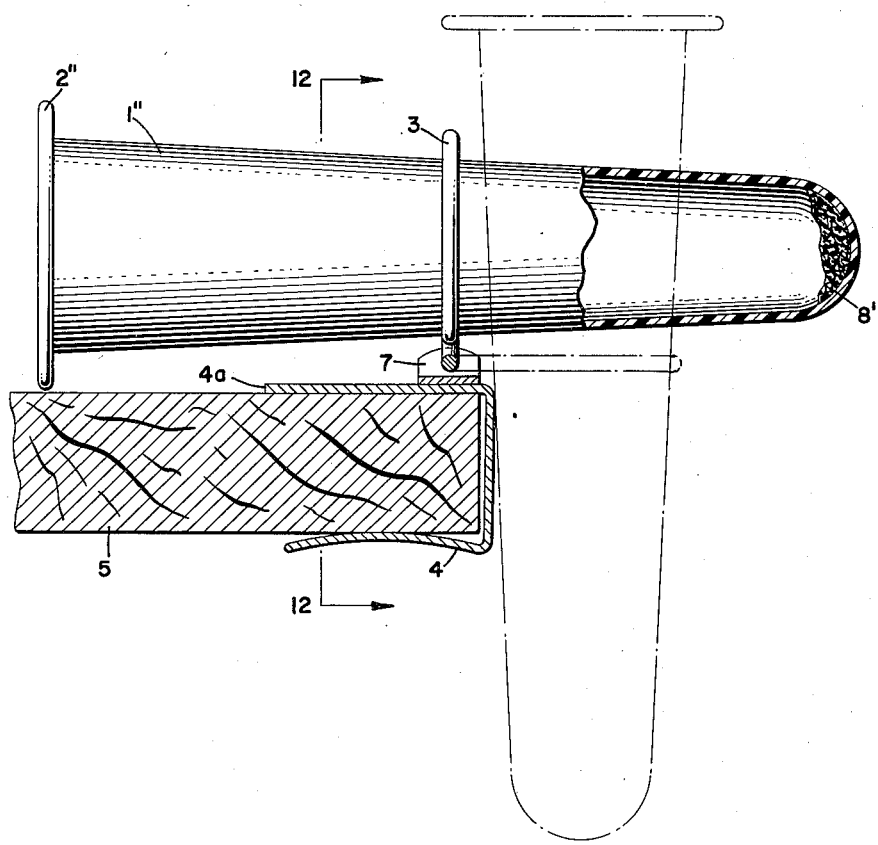
Fig. 11 shows partly in side view and partly in cross-section another embodiment of the invention.
Figure 12:
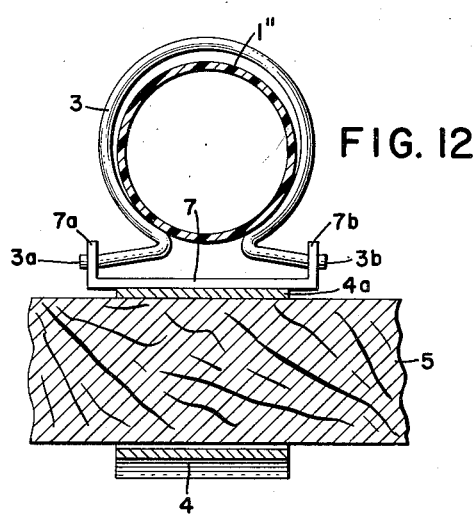
Fig. 12 is a cross-section along 12—12 of Fig. 11.

Figs. 11 and 12 illustrate an embodiment of the invention comprising a tapered trapping receptacle 1" made of plastic-impregnated paper. Receptacle 1" may be stacked together with a number of identical tapered trapping receptacles, as mentioned before. The bait 8' is permanently affixed to the bottom of receptacle 1" and accessible only to the animal to be trapped. It is of the poisonous unperishable type. The holder 3 shown in Figs. 11 and 12 is in substance the same as that shown in Figs. 5 and 6 including trunnions 3a, 3b supported in bearings 7a, 7b of bracket 7. Bracket 7 is in turn supported by the upper shank 4a of clamp 4. The dotted line in Fig. 11 indicates the tapered trapping receptacle 1" in the tilted position thereof. It will be noted that the sliding motion of the receptacle 1" relative to the holder 3 is limited on account of the strong taper of receptacle 1". Any desired increase of the sliding motion of the receptacle 1" relative to the holder 3 may readily be achieved either by reducing the taper of receptacle 1" or by increasing the diameter of the holder 3. It will be noted from Fig. 11 that receptacle 1" has also a rim 2". This rim is provided for reinforcing receptacle 1" and for resting receptacle 1" on table-top 5 rather than for limiting the sliding motion of receptacle 1" relative to holder 3.

It will be understood that by illustrating several preferred embodiments of my invention, I do not intend to limit my invention thereto. It will further be understood that while the arrangements described and illustrated herein are the preferred embodiments of my invention, the same may take forms other than specifically shown and described herein. It will be apparent for those skilled in the art that various changes and modifications may be made without departing from the spirit of the invention or from the scope of the appended claims.

It is claimed and desired to secure by Letters Patent:

1. In an animal trap a tubular receptacle adapted to be tilted from a substantially horizontal position to a substantially vertical position under the action of the weight of an animal moving therein, a holder slidingly supporting said receptacle, and a support on which said holder is pivotally mounted.

2. In an animal trap a tubular receptacle adapted to be tilted from a substantially horizontal position to a substantially vertical position under the action of the weight of an animal moving therein, a holder slidingly supporting said receptacle, and a clamp on which said holder is pivotally mounted.

3. In an animal trap a tubular receptacle adapted to be tilted from a substantially horizontal position to a substantially vertical position under the action of the weight of an animal moving therein, a holder slidingly supporting said receptable, a support on which said holder is pivotally mounted and weight means supported by said holder for counter-balancing said receptacle when in said substantially horizontal position thereof.

4. In an animal trap a tubular receptacle adapted to be tilted from a substantially horizontal position to a substantially vertical position under the action of the weight of an animal moving therein, a holder slidingly supporting said receptacle, a support on which said holder is pivotally mounted and a lid for said receptacle hingedly supported on said holder.

5. In an animal trap a tubular receptacle adapted to be tilted from a substantially horizontal position to a substantially vertical position under the action of the weight of an animal moving therein, a gravity operated lid for closing said receptacle when in said substantially vertical position, a holder hingedly supporting said lid and slidingly supporting said receptacle, and a clamp on which said holder is pivotally mounted.

6. An animal trap comprising a tubular animal receptacle normally supported in equilibrium in a substantially horizontal position, a support means on said support providing a tilting axis for said receptacle effective upon upsetting of the equilibrium thereof, and holder means for said receptacle permitting a limited sliding motion of said receptacle in a direction longitudinally thereof, said holder means including a lever pivotally mounted on said support and abutment means adapted to cooperate with said receptacle to provide a suspension in space of the upper end of said receptacle when in a substantially vertical position.

7. An animal trap comprising a tubular animal receptacle normally supported in a substantially horizontal position, a substantially annular holder for suspending said receptacle in a substantially vertical position, said holder loosely surrounding said receptacle and permitting a limited longitudinal sliding motion thereof, means for adapting said holder to form a counterweight for balancing said receptacle in said substantially horizontal position, and a pivotal support for said holder arranged between the center of gravity of said receptacle and the center of gravity of said holder and providing a common center of rotation for said receptacle and holder effective upon upsetting of the equilibrium thereof.

8. An animal trap comprising a tubular receptacle for receiving the animal to be trapped, a support supporting said receptacle in a substantially horizontal position, said receptacle projecting in cantilever-fashion from said support and being free to slide in a longitudinal direction relative to said support, a substantially annular holder for said receptacle pivotally mounted on said support, said receptacle being loosely inserted into said holder to permit sliding thereof relative to said holder, and cooperating abutment means on said receptacle and on said holder for limiting sliding motion of said receptacle relative to said holder.

9. An animal trap comprising a receptacle open at one end thereof and substantially closed at the other end thereof, a lid hingedly supported by a holder slidingly supporting said receptacle, said lid being adapted to be held in an open position by engagement thereof with the lateral outer wall of said receptacle, and means for pivotally supporting said holder to initiate gravitational relative sliding motion between said holder and said receptacle to cause the lateral outer wall thereof to move out of engagement with said lid to effect closing by said lid of said receptacle.

10. In an animal trap a tubular receptacle for the animal to be trapped, means for supporting said receptacle in a substantially horizontal equilibrium position and adapted to permit said receptacle to be tilted under the action of the weight of an animal moving therein, guiding means for said receptacle permitting said receptacle to slide in a direction longitudinally thereof relative to said supporting means, and abutment means for limiting sliding movement of said receptacle relative to said supporting means.

11. An animal trap comprising a tubular receptacle having a laterally projecting rim at an open end thereof, a substantially annular holder loosely surrounding said receptacle and forming an abutment cooperating with said rim to limit sliding movement of said receptacle relative to said holder, and a clamp pivotally supporting said holder to permit tilting of said holder relative to said clamp about an axis arranged transversely with respect to the longitudinal axis of said receptacle.

12. An animal trap comprising a tubular receptacle substantially in the shape of a test tube and consisting of a polymerized plastic material having a smooth external surface, an annular metal holder loosely receiving said receptacle and having a smooth internal surface for minimizing friction between said internal surface and said external surface, and a clamp arranged with the open end thereof in the same direction as the open end of said receptacle and pivotally supporting said holder to permit pivotal movement thereof relative to said clamp about an axis arranged transversely with respect to said receptacle.

13. An animal trap according to claim 1 wherein the tubular receptacle is made at least in part of a readily disposable substance in the nature of paper.

14. An animal trap according to claim 1 wherein the tubular receptacle is made of plastic-impregnated paper and an unperishable poisonous bait is affixed to the inside of said receptacle adjacent the closed end thereof.

15. An animal trap according to claim 1 wherein the tubular receptacle is made substantially of plastic-impregnated paper and adapted to be readily disposed of and wherein said receptacle is tapered toward the closed end thereof to permit stacking of a plurality of identical receptacles.

16. In an animal trap a tubular receptacle adapted to be tilted from a substantially horizontal equilibrium position to a substantially vertical equilibrium position under the action of the weight of the animal moving therein, a holder loosely surrounding said receptacle to permit sliding movement of said receptacle in a direction longitudinally thereof with regard to said holder, means in the nature of cooperating abutments on said receptacle and on said holder for limiting sliding movement of said receptacle and said holder, and a support on which said holder is pivotally mounted, said support including a pair of surfaces defining a horizontal edge, said receptacle projecting in cantilever fashion across and beyond said edge when said receptacle is in said substantially horizontal equilibrium position and tilting about said edge during the movement thereof from said substantially horizontal equilibrium position to said substantially vertical equilibrium position.

LOTHAR C. CRONBERGER.

References Cited in the file of this patent
UNITED STATES PATENTS

| Number | Name | Date |
|---|---|---|
| 1,079,903 | Norton | Nov. 25, 1913 |
| 1,132,428 | Boswell | Mar. 16, 1915 |
| 2,426,797 | Stein | Sept. 2, 1947 |